United States Patent Office 2,693,704
Patented Nov. 9, 1954

2,693,704

MERCURY MANOMETERS, PARTICULARLY SPHYGMOMANOMETERS

Holger Hesse, Vedbaek, Denmark

Application May 1, 1953, Serial No. 352,535

Claims priority, application Great Britain May 15, 1952

3 Claims. (Cl. 73—401)

This invention concerns mercury manometers, particularly sphygmomanometers.

Conventional mercury manometers must be used with the manometer tube exactly vertical as otherwise substantial measuring errors may occur, and in the case of sphygmomanometers, this is often difficult to accomplish when blood pressure measurements are to be made at the bedside because the manometer will usually be placed on the bed, which may not be level, and moreover the physician will often tilt the manometer tube to the rear to facilitate its reading.

It is an object of the present invention to provide a manometer in which the aforesaid possibilities of errors in measuring are minimised, enabling the manometer tube to be tilted from its normal position without seriously affecting its accuracy.

Accordingly, therefore, one aspect of the present invention provides a mercury manometer in which the mercury reservoir is disposed to the rear of the manometer tube, one end of said reservoir being disposed nearer the manometer tube than the other end of the reservoir, said nearer end of the reservoir being at a higher level than said other end of the reservoir.

The manner in which the aforesaid errors in measuring arise, and the means by which the invention minimises such faults, is hereinafter described with reference to the accompanying drawings in which.

Figures 1A, 1B, 1C, 2, 3, 4:
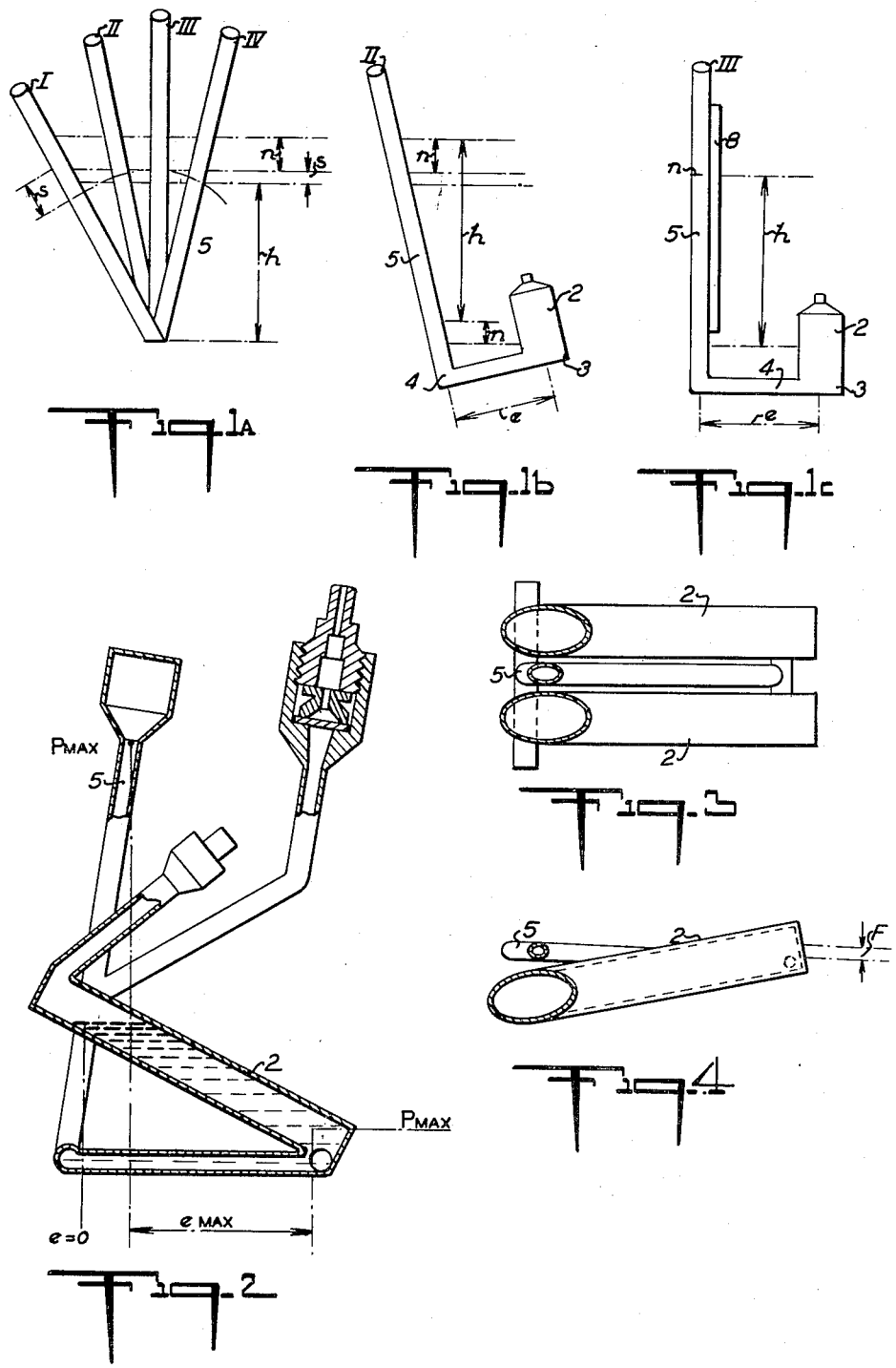
Figures 1a, 1b and 1c illustrate the effect of tilting a manometer tube, Figure 1a illustrating the case when the mercury level in the reservoir is assumed to be constant, Figure 1b showing, in front elevation, a conventional sphygmomanometer in a laterally tilted position, and Figure 1c being a front elevation of the manometer of Figure 1b in its normal position.
Figure 2 is a side elevation of a manometer constructed in accordance with an embodiment of the invention.
Figure 3 is a section along a line equivalent to the line III—III of Figure 2, but through a manometer having a dual mercury reservoir.
Figure 4 is a section similar to Figure 3 but showing the construction of a manometer according to another embodiment of the invention in which a single mercury reservoir is employed.

The errors in measuring which occur upon tilting conventional manometers will be explained with reference to Figures 1a to 1c; for the sake of simplicity, Figures 1a, 1b and 1c show open manometer tubes.

If a manometer tube 5 in Figure 1a is vertical, as shown in position III, and a pressure of $h$ mm. Hg is applied to the mercury reservoir 2, the mercury 3 will rise $h$ mm. in the tube to the scale index value $h$. This indication is correct. Within a certain tilting range of about 20° in relation to the vertical position (e. g. between positions II and IV) an error $s$, which is of little importance, will occur because the mercury column maintains its level $h$ mm. above the level in the reservoir 2 and therefore in the inclined tube indicates a scale index value $(h+s)$. However, this error $s$ is only insignificant provided the mercury level in the mercury reservoir does not vary with the inclination of the manometer tube 5. This provision is actually fulfilled if a conventional sphygmomanometer with a laterally disposed reservoir is tilted to the front or the rear.

However, if a conventional sphygmomanometer is tilted laterally, the mercury level in the reservoir is altered, as will be apparent from Figures 1b and 1c. Upon lateral tilting the mercury level is either raised or lowered; the amount $+n$ or $-n$ corresponding to this raising or lowering respectively is added to the above mentioned error $s$, which is always positive, so that the total measuring error will be $s+n$ or $s-n$. In the latter case the errors may balance each other, whereas in the former case there will always be a substantial additive error.

The additive error $s+n$ is sufficient to render readings considerably incorrect and hence conventional sphygmomanometers must always be placed on a horizontal support if measurements are to be accurate. Such manometers should not, therefore, be placed on the sick-bed, if accurate blood pressure measurements are to be made.

There is, however, a certain risk that the manometer will be tilted considerably to the rear to facilitate reading of the scale, and the error $s$ may reach the larger, not insignificant value S when the manometer is in the position I shown in Figure 1a. It therefore appears desirable initially to design the manometer in such a way that instead of the conventional vertical position III with permissible tilting within the range between positions II and IV, the "normal" position for the manometer is position II so that the manometer may be tilted throughout the range between positions I and III without error $s$ becoming significant. So far this has not been possible because the error $s$, which is insignificant in the range between positions II to IV, is disproportionately enlarged upon tilting from position II to position I owing to the cosine law relationship between $s$ and the angle of inclination of the tube 5.

According to another aspect of the present invention, the considerable error S may be compensated by disposing the mercury reservoir to the rear of the manometer tube since, in this way advantage is taken of the fact that error S, which is always positive (Figure 1a), may be compensated by the negative error $n$ if the mercury reservoir is lowered as a result of rearward tilting of the manometer. However, since the value of the positive error S is proportional to the value $h$, i. e. to the atmospheric pressure applied to the mercury in the reservoir, a complete compensation is only obtained if the lowering $-n$ is also proportional to the said pressure. This would not be the case in the construction illustrated in Figures 1b and 1c because the displacement $e$ is constant.

The said lowering $-n$ may be made dependent on the aforesaid pressure by disposing the reservoir, e. g. in the way shown in Figure 2, so as to extend behind the manometer tube with one end of the reservoir adjacent to the manometer tube and at higher level than the other (remote) end of the reservoir. When air pressure is applied, the mercury level falls in the reservoir whilst simultaneously the eccentricity $e$ increases and attains its maximum value at maximum pressure. Thus the positive error $s$ increasing in proportion to the pressure is compensated by the lowering $-n$ of the level which also is proportional to the pressure.

Figure 3 is a sectional view of a manometer provided with a compression space, the inclined mercury reservoir of which is of the dual or twin type. If a manometer of the kind illustrated in Figure 3 is laterally tilted the effect of the dual reservoir compensates the error $n$ and only the insignificant error $s$ remains, however, without prejudice to the exactitude of the measurement. On the other hand, if the manometer is tilted to the rear, the pressure-dependent lowering $(-n)$ of the mercury level in the reservoir(s) will compensate the error $s$ even if this error has the magnitude S caused by tilting from the normal position to a position corresponding to position I (Figure 1a).

It has been found that this compensation may be so effected that a manometer which is normally tilted to the rear and which may be read off without parallax has a satisfactory tilting tolerance in all directions.

As blood pressure values below 40 mm. Hg are of no interest, a greater tilting error may be admitted for the range from 0 to 40 mm. Hg. In this case a simplified container may be used, for example, as illustrated in Figure 4, which is so obliquely disposed or curved in the lateral direction that at pressure values exceeding about 40 mm. Hg the mercury level varies practically in the axial direction of the manometer tube 5.

What I claim is:

1. A mercury manometer in which the mercury reservoir is disposed to the rear of the manometer tube, one end of said reservoir being disposed nearer the manometer tube than the other end of the reservoir, said nearer end of the reservoir being at a higher level than said other end of the reservoir.

2. A manometer according to claim 1, wherein said mercury reservoir comprises a pair of containers disposed laterally of the manometer tube at equal distances on the opposite sides thereof.

3. A manometer according to claim 1, wherein said reservoir is obliquely disposed or curved in the lateral direction so that at pressure values exceeding about 40 mm. Hg the mercury level varies in a direction substantially parallel with the manometer tube axis.

References Cited in the file of this patent

FOREIGN PATENTS

| Number | Country | Date |
|---|---|---|
| 522,816 | Great Britain | June 27, 1940 |

OTHER REFERENCES

The Manometer and Its Uses, pp. 15, 17, 18, 19; 1938 ca. The Meriam Co., Cleveland, Ohio.